(12) United States Patent
Conley

(10) Patent No.: US 6,393,119 B1
(45) Date of Patent: *May 21, 2002

(54) METHOD AND SYSTEM FOR ASSIGNING A COMMUNICATION TO A NETWORK OF A SERVICE PROVIDER

(75) Inventor: Warren David Conley, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,484

(22) Filed: Aug. 2, 1999

Related U.S. Application Data

(63) Continuation of application No. 08/756,443, filed on Nov. 26, 1996, now Pat. No. 5,953,402.

(51) Int. Cl.$^7$ .......................... H04M 7/00; H04M 1/27; H04M 3/44
(52) U.S. Cl. ..................... 379/220.01; 379/216.01; 379/355.04; 379/355.08
(58) Field of Search ................. 379/112, 114, 379/120, 130, 201, 216, 220, 221, 355, 112.01, 114.01, 201.01, 216.01, 220.01, 221.02, 355.01, 355.02, 335.03, 355.04, 355.05, 355.06, 355.07, 355.08, 355.09, 355.1, 356.01, 357.01

(56) References Cited

U.S. PATENT DOCUMENTS 5,583,925 A * 12/1996 Bernstein ..................... 379/202

* cited by examiner

Primary Examiner—Harry S. Hong
(74) Attorney, Agent, or Firm—Kilpatrick Stockton LLP

(57) ABSTRACT

A method and system for assigning a communication to a network of a service provider. Through a communication device, a user provides an indication of a preference for a network of a service provider to the telecommunications system serving the communication device. In the preferred method, the preference is indicated by the user by pressing the "#" key followed by pressing the "1" key on the keypad of the communication device. The pressing of the "#" key followed by the "1" key results in two different dual tone multifrequency (DTMF) signals in a certain order being passed to the system serving the communication device. The system's receipt of the "#" DTMF signal followed by the "1" DTMF signal results in the override of the subscription assignment at the communication device, and assignment of the communication to the network of the selected service provider associated with the "#" DTMF and "1" DTMF signals.

13 Claims, 2 Drawing Sheets

FIG. 2B  FIG. 2C

METHOD AND SYSTEM FOR ASSIGNING A COMMUNICATION TO A NETWORK OF A SERVICE PROVIDER

This application is a continuation of application Ser. No. 08/756,443, now U.S. Pat. No. 5,953,402, filed Nov. 26, 1996

TECHNICAL FIELD

The present invention generally relates to the field of telecommunications, and particularly relates to the field of communication assignment for transmission by a network of a service provider

BACKGROUND OF THE INVENTION

Telecommunication service providers fight for customers on many different fronts including the provision of business service and the provision of residential service. When a service provider lands a customer, the network of that service provider generally transmits the communications or provides for the transmission of communications from that customer's business or residence to the called party's terminating device. Of course, a customer may select a particular service provider for a particular service such as long distance service, and a different service provider for a different service such as local service. In the case of business or residential service, the assignment of a communication received from a particular business or residence to a network of a service provider is carried out based on the subscription information provided by the customer. For example, if a customer has subscribed to Acme Communications for local residential service, then a local call made from the customer's residence is assigned to Acme's network for transmission to the called party.

Problems relating to the assignment of a communication arise in certain circumstances. A communication assignment problem may arise when a customer desires to make a call from a telephone that is not associated with the customer's subscription with a service provider. For example, a customer may desire to make a call from a pay telephone or from a telephone in a friend's home. Problems typically do not arise in the transmission of that communication. Rather, problems arise when the customer wants to make a call from a "non-subscription" telephone, and the customer desires to reap the benefits of the customer's subscription with a particular service provider. To reap the benefits, the customer must be able to have the call assigned to the network of the customer's service provider. And even if the customer is not keenly interested in reaping the benefits of the customer's subscription with a particular service provider, the service provider is interested in transmitting the customer's communications on its network or otherwise providing for the transmission of the communications. By transmitting communications or by providing for their transmission, the service provider garners revenue. Thus, service providers generally are very interested in having communications assigned to them for transmission or for providing for their transmission.

The service of pay telephones is one area where service providers may increase their business over and above the enlistment of new subscribers to business service or residential service. Of course, the owner of a pay telephone may subscribe to a particular service provider for the transmission of local or long distance calls from the pay telephone. In this case of subscription assignment, a local or long distance call made from the pay telephone is assigned to the service provider to which the owner of the pay telephone subscribes for transmission on the service provider's network. The assignment of the call typically takes place at the central office and is based on a carrier identification code (CIC) received in association with the communication from the pay telephone at the central office.

However, the assignment of a call from a pay telephone to a particular service provider may be overridden so that the call is assigned to a different service provider. A customer using the pay telephone overrides the subscription assignment by indicating a preference for the network of a selected service provider. This override is often referred to as a "dial-around" feature in that the customer is able to get around the subscription assignment of calls to a service provider selected by the owner (i.e. subscriber) of the pay telephone. The customer may indicate a preference of the network of a selected service provider by the entry of information to indicate the customer's preference. Generally, this information is received at the central office and the carrier identification code for that communication is changed or disregarded so that the result is the assignment of the communication to the network of the customer's selected service provider.

It was noted immediately above that the customer indicates a preference for a network of a selected service provider by the entry of information. This information may be entered by voice response from the customer to a prompt provided to the customer upon activation of the pay telephone, i.e., when the customer picks up the handset. This information also may be entered through the use of a credit card or calling card, and in particular, through the use of the magnetic strip containing information on the credit card or calling card. In addition, this information may be entered through the use of the keypad on the pay telephone. Specifically, a customer may indicate a preference for the network of a selected service provider by pressing selected keys, which in turn, provide selected dual tone multifrequency (DTMF) signals to the central office. For example, a customer may choose to override the subscriber assignment of communications at a pay telephone so as to have the customer's communication transmitted by the network of American Telephone & Telegraph Company (AT&T). One way to override the subscriber assignment is to sequentially press the keys on the pay telephone's keypad that correspond to the alphanumeric expression: 1800CALLATT. In other words, the customer presses the keys of a keypad in the following order: 1-8-0-0-2 (for "C")-2 (for "A")-5 (for "L")-5 (also for "L")-2 (for "A")-8 (for "T")-8 (also for "T") or 1-8-0-0-2-2-5-5-2-8-8.

As noted above, the service of pay telephones is one area where service providers may increase their business. Thus, it is in the best interests of a service provider to make it as easy and convenient as possible for a customer to override a subscription assignment of a network for the transmission of a communication. In particular, it is in the best interests of a service provider to have its own subscribers as well as non-subscriber's select the service provider to transmit communications. In this way, the service provider transmits more communications, even communications from telephones such as pay telephones where the service provider does not have a subscription assignment, and thereby, the service provider garners more revenue.

The most common situation for the override of a subscription assignment typically takes place at a pay telephone. But an override of a subscription assignment may take place at other telephones as well. For example, a salesperson visiting a manufacturing plant may prefer to have calls transmitted by the salesperson's selected service provider so as to avoid call charges to the manufacturing plant, or for other reasons.

Therefore, there is a need for an easy and convenient way for a customer to indicate a preference of the network of a selected service provider for the transmission of the customer's communication.

There also is a need for an easy, fast and accurate way in which to implement a customer's indicated preference so that a communication associated with the indicated preference information is assigned for transmission to the selected service provider's network.

SUMMARY OF THE INVENTION

Generally stated, the present invention provides a method and system for assigning a communication to a network of a service provider. In particular, the present invention provides a method for a user using a communication device to indicate a preference for the network of a service provider for the transmission of a communication. In the preferred embodiment, this method for a user consists of the steps of inputting a first dual tone multifrequency signal and then inputting a second DTMF signal. The first DTMF signal followed by the second DTMF signal preferably corresponds to the network of the service provider. Further, the first DTMF signal preferably consists of a "#" DTMF signal, and the second DTMF signal preferably consists of a "1" DTMF signal.

In the disclosed embodiment, the preference is indicated by the user by pressing the "#" key followed by pressing the "1" key on the keypad of the communication device. The pressing of the "#" key followed by the "1" key results in two different dual tone multifrequency (DTMF) signals in a certain order being interpreted within the communication device or being passed to the central office serving the communication device for interpretation and association with a particular service provider.

The present invention also provides that a communication be assigned to a network based on the indicated preference by the user placing the communication. In the preferred embodiment, the receipt of the "#" DTMF signal followed by the "1" DTMF signal results in the override of the subscription assignment at the communication device, and assignment of the communication to the selected service provider corresponding to the "#" DTMF and "1" DTMF signals. Advantageously, the present invention provides an easy and convenient way for a customer to indicate a preference for a selected service provider. And the present invention provides an easy, fast and accurate way in which to implement a customer's indicated preference of selected service provider.

In an embodiment of the present invention, an easy and convenient method is provided for a user to indicate a preference for the network of a service provider for the transmission of a communication that is based on the relative positions of certain keys on the keypad on the communication device. In this embodiment, the communication device includes a keypad having a plurality of keys arranged in a matrix including a plurality of rows and a plurality of columns. Preferably, the keypad has four rows and three columns. After activating the communication device to initiate a communication, the user indicates a preference in the following manner. First, the user presses the bottom right key, which is the key in the bottom row of the plurality of rows and in the furthest right column of the plurality of columns. Then, the user presses the top left key, which is the key in the top row of the plurality of rows and in the furthest left column of the plurality of columns. By pressing the bottom right key and then the top left key on the communication device, the user has indicated his/her preference of a network. Advantageously, the user may enter his/her preference for a selected service provider in this easy and convenient manner. The user does not have to memorize special codes, or to translate any codes into the keys of the alphanumeric keypad. The user simply presses the bottom right key followed by the top left key to indicate his/her preference.

As noted above, the present invention also provides a method for assigning a communication to a network of a service provider for transmission to a terminating device based on an indicated preference by the user placing the communication. In this disclosed method, notice is received of the activation of a communication device. After receiving the notice, a "#" dual tone multifrequency (DTMF) signal followed by a "1" DTMF signal is received from the communication device. A determination is made that receipt of the "#" DTMF signal followed by the "1" DTMF signal indicates a preference by the user for a particular network of a service provider for the transmission of a communication received from the communication device and directed to the terminating device. The communication then is assigned to the particular network of the service provider for the transmission of the communication to the terminating device.

Therefore, it is an object of the present invention to provide an easy and convenient way for a customer to indicate a preference of the network of a selected service provider for the transmission of the customer's communication.

It is also an object of the present invention to provide an easy, fast and accurate way in which to implement a customer's indicated preference so that a communication associated with the indicated preference is assigned for transmission to the selected service provider's network.

That the present invention and the preferred embodiment thereof overcome the drawbacks set forth above and accomplish the objects of the invention set forth herein will become apparent from the detailed description of the preferred embodiment to follow.

BRIEF DESCRIPTION OF THE DRAWINGS

FIG. 2B is a flow chart illustrating further detail of the preferred method illustrated in FIG. 2A.

FIG. 2C is a flow chart illustrating further detail of the preferred method illustrated in FIG. 2A.

DETAILED DESCRIPTION

Generally stated, the present invention provides a method and system for assigning a communication to a network of a service provider. Advantageously, the present invention provides an easy and convenient way for a customer to indicate a preference for a selected service provider. And the present invention provides an easy, fast and accurate way in which to implement a customer's indicated preference of selected service provider.

The preferred embodiment of the present invention is described in the context of a user or customer ("Chris") placing a telephone call through use of a pay telephone. The term "user" is used to generally indicate the person placing the call, but it will be understood that the "user" may not necessarily be a person. A "user" is defined herein to include a device (or person) that places a communication through the use of a communication device. A communication device may include a telephone, a pay telephone, a modem, a facsimile machine, a cellular telephone, a wireless unit, etc. Reference is made to a "terminating device" which is a communication devices and more specifically, which is the device to which a communication is directed through the use of a directory number. The term "call" or "communication" is used generally to refer to any type of exchange that may occur between an originating device and a terminating device in a telecommunications system. A "call" or "communication" may include voice, data and video communications.

Figure 1:
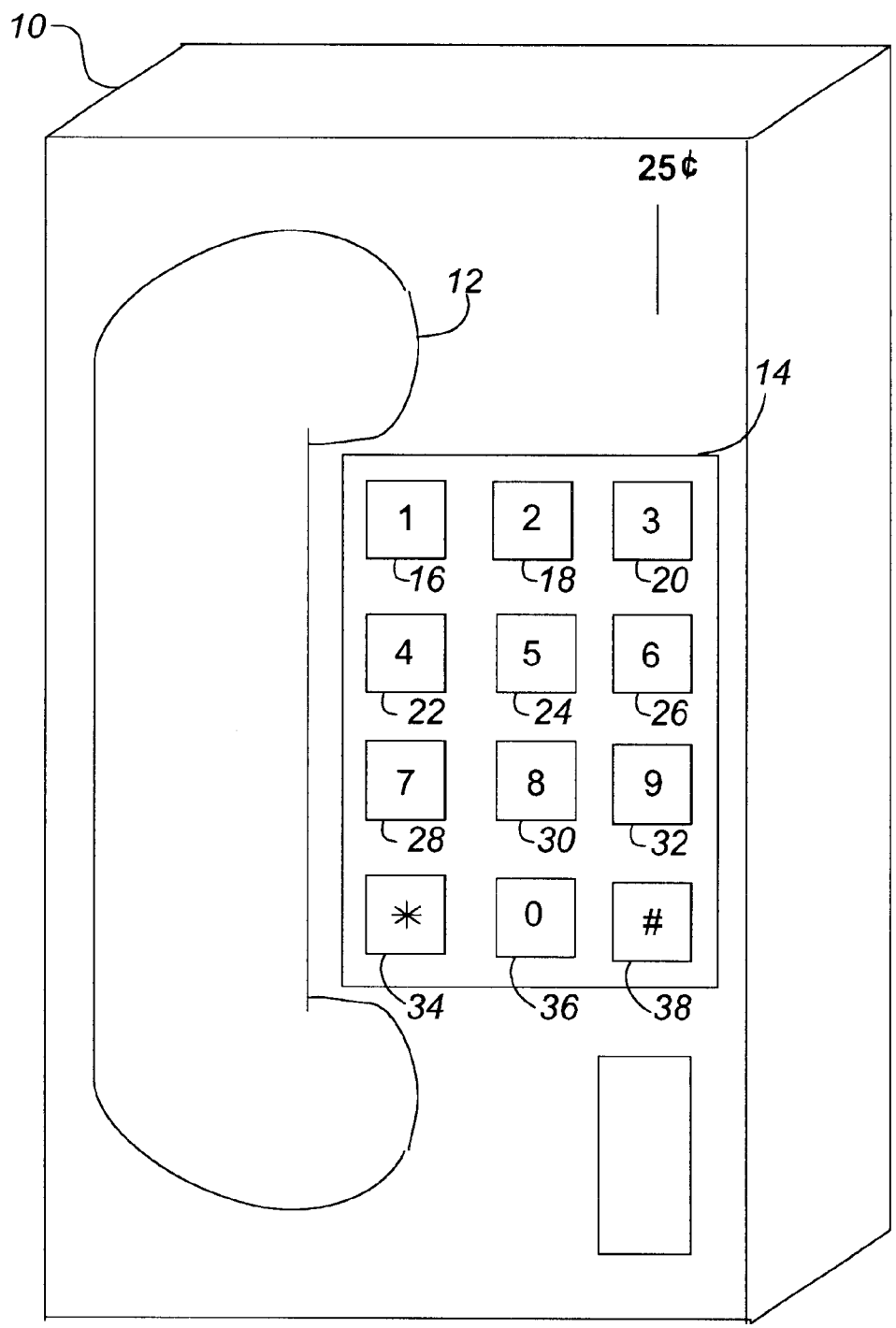
FIG. 1 is an illustration of a pay telephone such as may be used in connection with the preferred embodiment of the present invention.

FIG. 1 is an illustration of a pay telephone 10 such as may be used in connection with the preferred embodiment of the present invention. Chris is interested in placing a telephone call to his business, Arena Enterprises. Chris reads a notice on the pay telephone that informs him that the subscription assignment of all calls made from this pay telephone is to Big Telecom Company. Chris is a subscriber to Acme Telecommunications from which he receives less expensive service charges than from Big Telecom Company. Chris is interested in saving money so he employs the method of the preferred embodiment to override or dial around the subscription assignment associated with pay telephone 10.

Chris overrides the subscription assignment associated with the pay telephone 10 by activating the pay telephone, and in particular, by picking up the handset 12 of the pay telephone. The pay telephone or central office of the telecommunications company that serves this pay telephone receives notice of the activation in a manner well known to those skilled in the art. Chris then indicates his preference for Acme Telecommunications to carry his communication. In other words, Chris indicates his preference for the network of the service provider that he desires to transmit his communication.

The term "network" is used herein to include the elements of a telecommunications network that are typically used to transmit communications in part or completely from an originating communication device to a terminating device. The term "service provider" is used herein to include the entity that provides or provides in part the service of communication transmissions. Those versed in the field of telecommunications will understand that a "service provider" may not actually transmit a communication over lines or through elements that the service provider owns or manages itself. Rather, the term "service provider" is used in a more general sense of an entity that enters into a relationship with a subscriber or user such as Chris to provide or to have provided telecommunication services.

In the preferred embodiment, Chris indicates his preference for the network of a particular service provider through the use of the keypad 14 of the pay telephone 10. The keypad 14 includes twelve keys 16–28 arranged in a matrix including four rows and three columns. The keys are numbered or lettered as follows: "1" key 16, "2" key 18, "3" key 30, "4" key 22, "5" key 24, "6" key 26, "7" key 28, "8" key 30, "9" key 32, "*" key 34, "0" key 36 and "#" key 38.

In particular, to indicate his preference, Chris presses the "#" key 38 followed by the "1" key 16. In the matrix of keys illustrated in FIG. 1, the "#" key 38 is the bottom right key in that it is a key in the bottom row of the four rows of the keypad 14 and it is a key in the furthest right column of the three columns of the keypad 14. If the keypad had been configured differently, the "#" key would not necessarily have been the bottom right key. Also in the matrix of keys as illustrated in FIG. 1, the "1" key 16 is the top left key in that it is a key in the top row of the four rows of the keypad 14 and it is a key in the most left column of the three columns of the keypad 14. If the keypad had been configured differently, the "1" key would not necessarily have been the top left key.

An embodiment of the present invention provides that a user press first the bottom right key followed then by the top right key. There are several advantages of having a user press the bottom right key followed by the top left key to indicate a service provider preference. First, these keys are easy to find based on the location of these keys with respect to the other keys of the keypad. Also, these keys are easy to press in the sequence specified of pressing the bottom right key followed by the top left key. These keys are easy to press in this sequence because the sequence obviates difficulties in pressing a first key and then a second key that is very close and therefore confusing with respect to the first key. In addition, by pressing keys based on their location in a keypad, the user does not have to hunt and peck for alphanumeric symbols and/or their corresponding keys.

As those skilled in the art will understand, the result of pressing a key on a keypad of a telephone results in the transmission of a dual tone multifrequency (DTMF) signal to the telephone controller or to the switch or central office serving the telephone. As those skilled in the art will also understand, DTMF signals may be generated in other ways than by pressing a key of a telephone keypad, and the present invention contemplates the use of other ways of generating DTMF signals than just by pressing keys of a telephone keypad. For example, a modem and a facsimile machine may generate DTMF signals. The DTMF signals corresponding to "#" and "1" are received by the switch serving the pay telephone. The switch determines whether these DTMF signals correspond to a network or a service provider in a manner well known to those skilled in the art. If these DTMF signals correspond, the switch assigns the communication to the network of the selected service provider to which the DTMF signals correspond. Alternatively, the DTMF signals resulting from the user's pressing of keys may be checked by a telephone controller or processing function in the telephone (rather than the switch or central office) in a manner well known to those skilled in the art for correspondence to a particular network or service provider The telephone controller provides information to the switch regarding assignment of the communication to a network or a service provider. In this manner, Chris has "dialed around" the service provided by the Big Telecom Company, and has obtained service from his service provider of choice, Acme Communications.

Figure 2A:
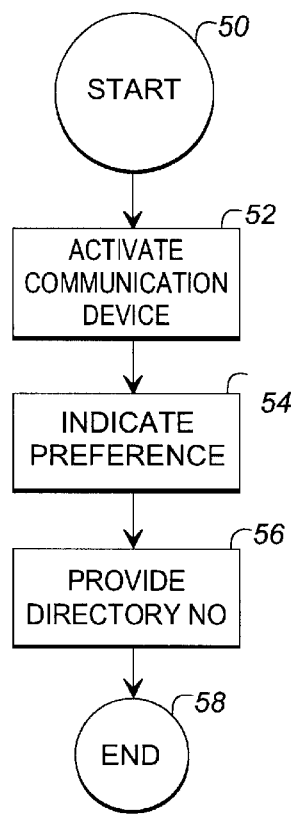
FIG. 2A is a flow chart of the preferred method of the present invention from a user's perspective.

FIG. 2A is a flow chart of the preferred method of the present invention from a user's perspective. After start step 50, the communication device is activated in step 52. Then in step 54, a preference indication is provided with respect to the network of a selected service provider for the transmission of a communication from the communication device. Additional details of step 54 are provided in connection with flow charts illustrated in FIGS. 2B and 2C. After a preference has been indicated, in step 56 a directory number may be provided. In the preferred embodiment, the directory number is used by the service provider to route the communication through its network to the terminating device. This step is optional to the present invention, and alternatively, the provision of a directory number may occur at another time than indicated in this flow chart.

FIG. 2B is a flow chart illustrating further detail of the preferred method illustrated in FIG. 2A. In particular, the preference indication of step 54 is provided in step 60 by the provision of a DTMF signal that corresponds to the "#" symbol or key as will be well known to those skilled in the art, and then in step 62 by the provision of a DTMF signal that corresponds to the "1" symbol or key as also will be well known to those skilled in the art.

FIG. 2C also is a flow chart illustrating further detail of the preferred method illustrated in FIG. 2A. In particular, the preference indication of step 54 is provided in step 64 by pressing the bottom right key and then in step 66 by pressing the top left key. Those skilled in the art will understand that by pressing the bottom right key and then by pressing the top left key in a telephone keypad 14 two DTMF signals corresponding respectively to these keys are generated. These two DTMF signals are not necessarily, but may be respectively the signals corresponding to the "#" key and the "1" key.

Figure 3:
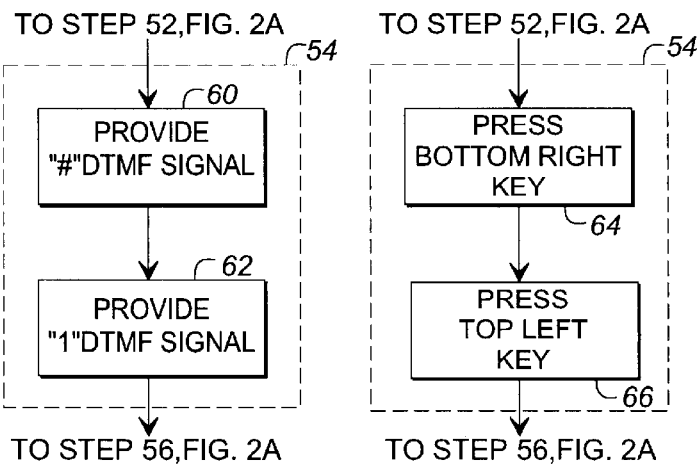
FIG. 3 is a flow chart of the preferred method of the present invention from a system's perspective.
Figure 3:
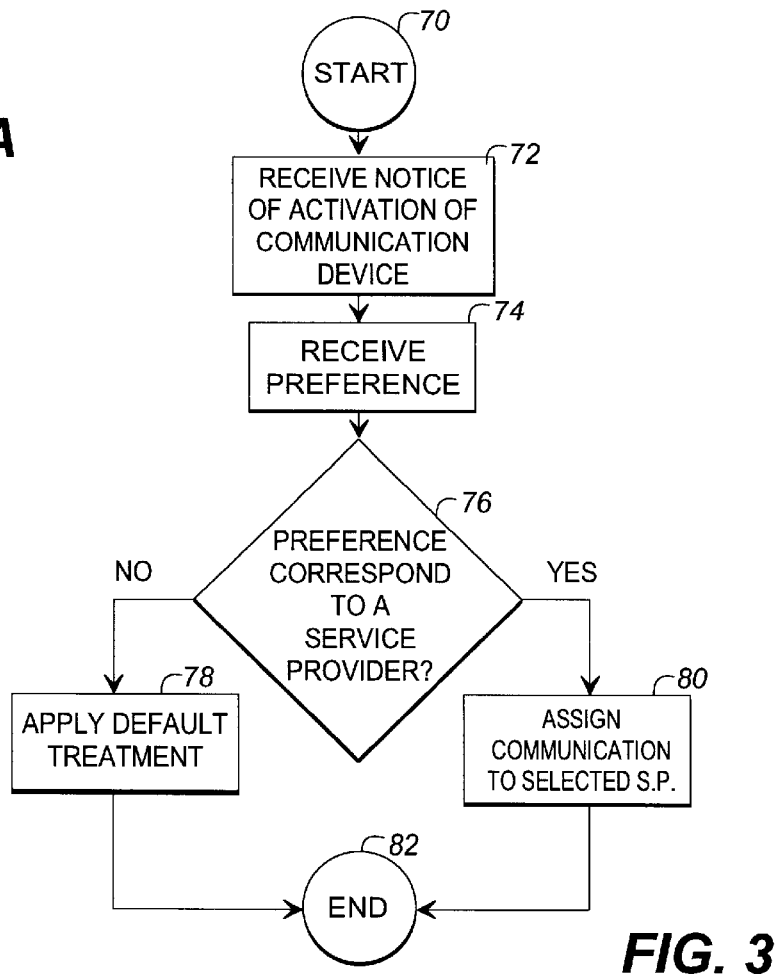

FIG. 3 is a flow chart of the preferred method of the present invention from a system's perspective. In other words, this flow chart illustrates the logic followed by the recipient of the signals that were generated as a result of the methods illustrated in FIGS. 2A–2C. After start step 70, in step 72 notice is received of the activation of a communication device, such as, for example, by a pay telephone handset going "off-hook". In step 74, a preference is received for the network of a selected service provider to transmit the communication. As explained above, this preference is indicated in the preferred embodiment by'DTMF signals that correspond to the "#" key and the "1" key. Alternatively, this preference may be indicated by DTMF signals that correspond to the bottom right key and the top left key. Those skilled in the art will understand that the system that receives this preference recognizes it as such a preference based on telecommunications protocols with respect to system signaling. Generally, such a preference may be referred to as a carrier identification code (CIC). Additional information regarding the CIC may be obtained from the "INC" document, INC95-0127-006, September 1996 revision, Industry Number Committee.

After receiving the preference, in step 76 a check is made to determine whether the preference corresponds to a service provider. To make this determination, the system preferably checks a reference table or database that includes a table of preferences and their corresponding network or service providers. This check may be implemented at the telephone or at the central office or switch. If the preference fails to correspond to a service provider, then in step 78 default treatment is applied and the method ends in step 82. A default treatment may include an announcement. On the other hand, if the preference corresponds to a network or service provider, then in step 80 the communication is assigned to a selected network or service provider, and the method ends in step 82.

In sum, the present invention provides a method and system for assigning a communication to a network of a service provider. Advantageously, the present invention provides an easy and convenient way for a customer to indicate a preference for a selected service provider and an easy, fast and accurate way for a telecommunications system to interpret that preference. Therefore, from the foregoing description of the preferred embodiment, other embodiments of the present invention will suggest themselves to those skilled in the art and therefore the scope of the present invention is to be limited only by the claims below and equivalents thereof.

I hereby claim:

1. A method for a user using a communication device to indicate a preference for the network of a service provider for the transmission of a communication, consisting of the steps of:

inputting a first dual tone multifrequency (DTMF) signal, wherein said first DTMF signal comprises a first predetermined DTMF signal; and then inputting a second DTMF signal, wherein said second DTMF signal comprises a second predetermined DTMF signal.

2. The method of claim 1, wherein said first DTMF signal consists of a pound ("#") DTMF signal and wherein said second DTMF signal consists of a two ("2") DTMF signal.

3. The method of claim 1, wherein said first DTMF signal consists of a pound ("#") DTMF signal and wherein said second DTMF signal consists of a three ("3") DTMF signal.

4. The method of claim 1, wherein said first DTMF signal consists of a pound ("#") DTMF signal and wherein said second DTMF signal consists of a four ("4") DTMF signal.

5. The method of claim 1, wherein said first DTMF signal consists of a pound ("#") DTMF signal and wherein said second DTMF signal consists of a five ("5") DTMF signal.

6. The method of claim 1, wherein said first DTMF signal consists of a pound ("#") DTMF signal and wherein said second DTMF signal consists of a six ("6") DTMF signal.

7. The method of claim 1, wherein said first DTMF signal consists of a pound ("#") DTMF signal and wherein said second DTMF signal consists of a seven ("7") DTMF signal.

8. The method of claim 1, wherein said first DTMF signal consists of a pound ("#") DTMF signal and wherein said second DTMF signal consists of an eight ("8") DTMF signal.

9. The method of claim 1, wherein said first DTMF signal consists of a pound ("#") DTMF signal and wherein said second DTMF signal consists of a nine ("9") DTMF signal.

10. The method of claim 1, wherein said first DTMF signal followed by said second DTMF signal corresponds to said network of said service provider.

11. The method of claim 1, wherein said first DTMF signal consists of a "#" DTMF signal, and wherein said second DTMF signal consists of a "1" DTMF signal.

12. A method for assigning a communication to a network of a service provider for transmission based on an indicated preference by the user placing said communication, comprising the steps of:

receiving notice of the activation of a communication device;

directly after receiving said notice, receiving a first predetermined dual tone multifrequency (DTMF) signal from said communication device;

directly after receiving said first DTMF, then receiving a second predetermined DTMF signal from said communication device;

determining that receipt of said first predetermined DTMF signal followed by said second predetermined DTMF signal directly after receipt of said notice of the activation of the communication device indicates a preference by said user for said network of said service provider; and assigning said communication to said network of said service provider for transmission of said communication.

13. The method for assigning a communication to a network of a service provider of claim 12, wherein said determining step comprises accessing a table of preferences with corresponding service providers.

\* \* \* \* \*